US010107386B2

(12) United States Patent
Watanabe et al.

(10) Patent No.: US 10,107,386 B2
(45) Date of Patent: Oct. 23, 2018

(54) SHIFT DEVICE

(71) Applicant: KABUSHIKI KAISHA TOKAI-RIKA-DENKI-SEISAKUSHO, Aichi-ken (JP)

(72) Inventors: Hironori Watanabe, Aichi-ken (JP); Toshiharu Katagiri, Aichi-ken (JP); Katsushi Miwa, Aichi-ken (JP); Masahiro Ikeyama, Aichi-ken (JP); Tomoaki Asai, Aichi-ken (JP); Koji Imai, Aichi-ken (JP); Shosaku Watarai, Aichi-ken (JP); Makoto Yamamoto, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 14/936,179

(22) Filed: Nov. 9, 2015

(65) Prior Publication Data

US 2016/0138704 A1    May 19, 2016

(30) Foreign Application Priority Data

Nov. 13, 2014 (JP) .................................. 2014-230829

(51) Int. Cl.
*F16H 59/08* (2006.01)
*F16H 59/02* (2006.01)
(Continued)

(52) U.S. Cl.
CPC ......... *F16H 59/08* (2013.01); *F16H 59/0278* (2013.01); *G05G 5/06* (2013.01);
(Continued)

(58) Field of Classification Search
CPC .... F16H 59/08; F16H 2059/081; F16H 59/02; F16H 59/0278; B60K 20/00;
(Continued)

(56) References Cited

U.S. PATENT DOCUMENTS

| 6,564,661 B2 * | 5/2003 | DeJonge | B60K 37/06 74/335 |
| 7,571,662 B2 * | 8/2009 | Pickering | B60K 37/06 200/61.88 |

(Continued)

FOREIGN PATENT DOCUMENTS

| EP | EP-2034383 A2 * | 3/2009 | ........... B60K 37/06 |
| EP | EP-3144766 A1 * | 3/2017 | ............... G05G 1/08 |

(Continued)

OTHER PUBLICATIONS

Extended European Search Report for application No. 15193796.8-1752 dated Mar. 31, 2016.

(Continued)

*Primary Examiner* — William Kelleher
*Assistant Examiner* — Bobby Rushing, Jr.
(74) *Attorney, Agent, or Firm* — Roberts, Mlotkowski, Safran, Cole & Calderon, P.C.

(57) ABSTRACT

In a shift device, a shift locking mechanism drives a motor to perform locking and locking release of rotation of a knob, and an autocorrect mechanism drives the motor to change a shift position of the knob to a P position. Thus, driving of the common motor enables locking and locking release of the rotation of the knob to be performed, and enables a shift position of the knob to be changed to the P position, thereby enabling a simple configuration.

7 Claims, 7 Drawing Sheets

(51) Int. Cl.
  *B60K 20/00* (2006.01)
  *G05G 1/08* (2006.01)
  *G05G 5/06* (2006.01)
  *G05G 5/08* (2006.01)
  *F16H 59/00* (2006.01)
  *G05G 1/10* (2006.01)
  *G05G 5/00* (2006.01)

(52) U.S. Cl.
  CPC ............... *G05G 5/08* (2013.01); *B60K 20/00* (2013.01); *F16H 2059/081* (2013.01); *G05G 1/08* (2013.01); *G05G 1/10* (2013.01); *G05G 5/00* (2013.01)

(58) Field of Classification Search
  CPC . B60K 20/02; G05G 1/08; G05G 1/10; G05G 7/00; G05G 9/02
  USPC ........ 74/473.3, 471, 473.12, 473.21, 473.24, 74/473.28; 180/336
  See application file for complete search history.

(56) References Cited

U.S. PATENT DOCUMENTS

| | | | |
|---|---|---|---|
| 7,971,498 B2 | 7/2011 | Meyer et al. | |
| 9,122,300 B2 * | 9/2015 | Oosawa | G05G 1/10 |
| 9,212,740 B2 * | 12/2015 | Watanabe | F16H 59/08 |
| 9,334,949 B2 * | 5/2016 | Fett | F16H 59/08 |
| 9,835,245 B2 | 12/2017 | Lee et al. | |
| 2010/0307276 A1 | 12/2010 | Giefer et al. | |
| 2014/0007726 A1 * | 1/2014 | Muraki | F16H 59/08 74/473.3 |
| 2015/0369358 A1 | 12/2015 | Lee et al. | |
| 2016/0238128 A1 | 8/2016 | Rake et al. | |
| 2016/0245403 A1 | 8/2016 | Rake et al. | |

FOREIGN PATENT DOCUMENTS

| | | | | |
|---|---|---|---|---|
| JP | 2008511063 A | 4/2008 | | |
| JP | 2014156153 A | 8/2014 | | |
| JP | JP-2017114176 A * | 6/2017 | | F16H 59/08 |
| KR | 101404909 B1 | 6/2014 | | |
| WO | 2011138177 A1 | 11/2011 | | |
| WO | WO 2013123375 A2 * | 8/2013 | | F16H 59/08 |
| WO | 2014142377 | 9/2014 | | |
| WO | 2015/055369 A1 | 4/2015 | | |
| WO | 2015/055370 A1 | 4/2015 | | |

OTHER PUBLICATIONS

Office Action issued in the corresponding EP application No. 15193796.8 dated Jan. 3, 2018.

Japanese Office Action in related Japanese Application No. 2014-230829 dated Feb. 27, 2018, 5 pages.

* cited by examiner

SHIFT DEVICE

CROSS-REFERENCE TO RELATED APPLICATION

This application claims priority under 35 USC 119 from Japanese Patent Application, No. 2014-230829 filed Nov. 13, 2014, the disclosure of which is incorporated by reference herein.

BACKGROUND

Field of the Invention

The present invention relates to a shift device in which a shift body is rotated to change a shift position of the shift body.

Related Art

In an operating device described in Japanese National-Phase Publication No. 2008-511063, a lock magnet restricts, or releases restriction of, rotation of a rotating handle. A drive device rotates a ring gear, thereby changing a rotatable range of the rotating handle, and changing a switch position of the rotating handle.

It is preferable to be able to simplify the configuration in such operating devices.

SUMMARY

In consideration of the above circumstances, a shift device capable of having a simple configuration obtained.

A shift device of a first aspect includes: a shift body that is rotated to change a shift position of the shift body; and an operating section that is provided with a drive section, wherein the drive section is driven to perform at least one of restricting, or releasing restriction of, rotation of the shift body, and the drive section is driven to change the shift position to a specific shift position of the shift body.

A shift device of a second aspect is the shift device, of the first aspect, further including a moving member that is provided at the operating section, that is moved to perform at least one of restricting, or releasing restriction of, rotation of the shift body, and that is moved to change the shift position to the specific shift position.

A shift device of a third aspect is the shift device, of the first aspect further including a moving member that is provided at the operating section, and that is moved toward one side to rotate the shift body to the specific shift position and, thereafter, is moved toward another side which is opposite to the one side, and of the second aspect, wherein the moving member is moved toward one side to rotate the shift body to the specific shift position and, thereafter, is moved toward another side which is opposite to the one side.

A shift device of a fourth aspect is the shift device of any one of the first aspect to the third aspect, wherein the operation section maintains released restriction of rotation of the shift body when the shift body is rotated to the specific shift position.

In the above aspects, it is possible that the moving member is supported at the shift body so as to relatively rotatable to the shift body; at least one of restricting, or releasing restriction of, rotation of the shift body is performed by the moving member being rotated by driving of the drive section; and the shift position is changed to the specific shift position of the shift body by the moving member being rotated by driving of the drive section, further, it is possible that the moving member is rotated toward one side to rotate the shift body to the specific shift position and, thereafter, is rotated toward another side which is opposite to the one side.

In the shift device of the first aspect, the shift body is rotated, and the shift position of the shift body is changed.

Note that the operating section is provided with the drive section, and in the operating section, the drive section is driven to perform at least one of either restricting, or releasing restriction of, rotation of the shift body, and further, the drive section is driven to change the shift position of the shift body to the specific shift position. Thus, the driving of a common (the same) drive section enables at least one of either restricting, or releasing restriction of, rotation of the shift body to be performed, and further enables the shift position of the shift body to be changed to the specific shift position, thereby enabling a simple configuration.

In the shift device of the second aspect, the moving member is provided at the operating section, and the moving member is moved to perform at least one of either restricting, or releasing restriction of, rotation of the shift body, and the moving member is moved to change the shift position of the shift body to the specific shift position. Thus, the moving of a common (the same) moving member enables at least one of either restricting, or releasing restriction of, rotation of the shift body to be performed, and further enables the shift position of the shift body to be changed to the specific shift position, thereby enabling an even simpler configuration.

In the shift device of the third aspect, the moving member is provided at the operating section. The moving member is moved toward the one side to rotate the shift body to the specific shift position, thereafter the moving member is moved toward the another side. This enables the shift body to be rotated in the opposite direction to the rotation direction toward the specific shift position of the shift body performed by moving the moving member toward the one side.

In the shift device of the fourth aspect, the operation section maintains restriction-release of rotation of the shift body when the shift body is rotated to a specific shift position. This enables the shift body to be rotated to the specific shift position.

BRIEF DESCRIPTION OF THE DRAWINGS

Embodiments of the invention will be described in detail with reference to the following figures, wherein.

DETAILED DESCRIPTION

Figure 1:
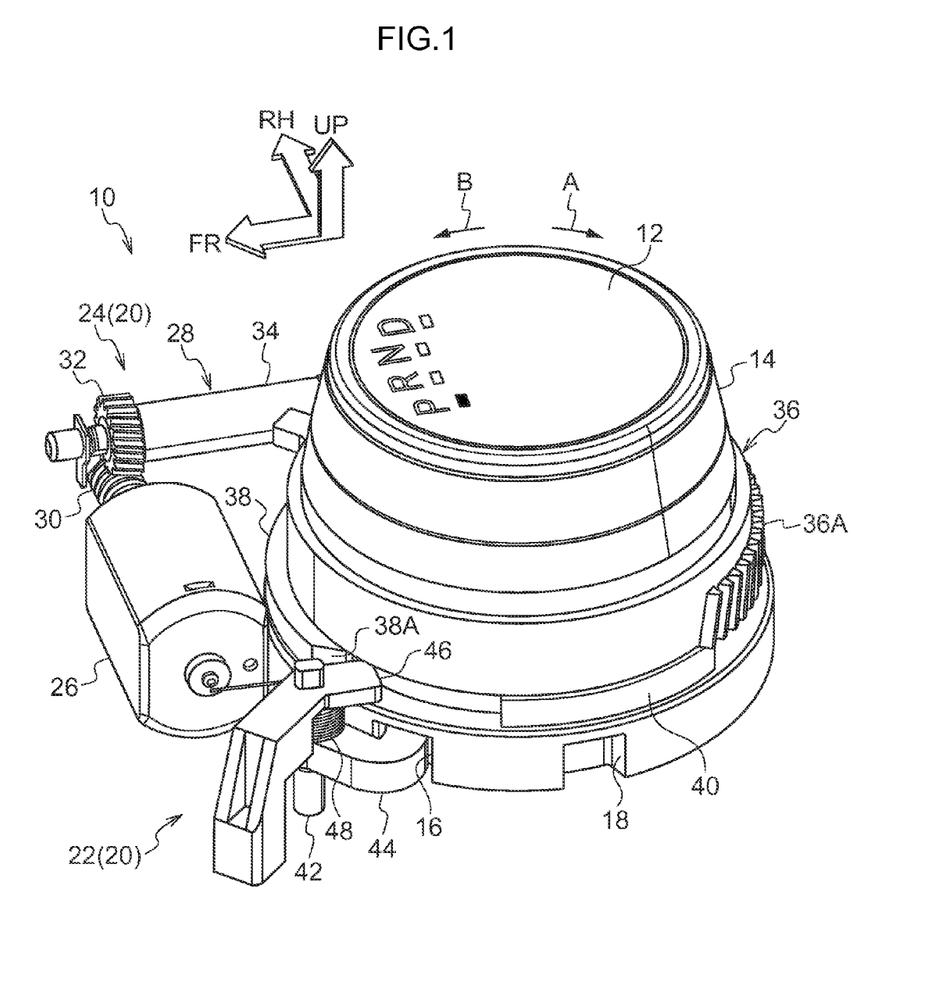
FIG. 1 is a perspective view illustrating a situation in which rotation of a knob from a P position is locked in a shift device according to an exemplary embodiment of the present invention, viewed diagonally from the front left.
Figure 2:
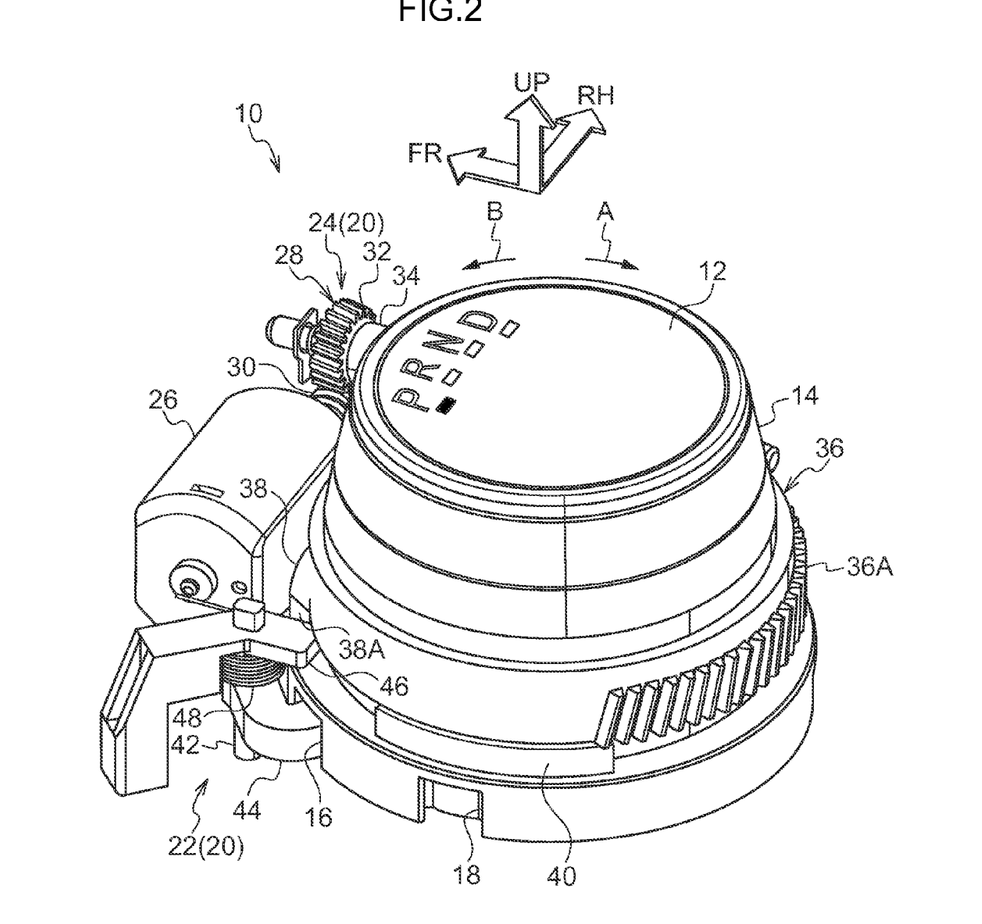
FIG. 2 is a perspective view illustrating a situation in which rotation of a knob from a P position is locked in a shift device according to an exemplary embodiment of the present invention, viewed diagonally from the rear left.

FIG. 1 is a perspective view illustrating a shift device 10 according to an exemplary embodiment as viewed diagonally from the front left, and FIG. 2 is a perspective view of the shift device 10 as viewed diagonally from the rear left. In the drawings, the arrow FR indicates the front of the shift device 10, the arrow RH indicates the right of the shift device 10, and the arrow UP indicates the upper side of the shift device 10.

The shift device 10 according to the present exemplary embodiment is what is referred to as a shift-by-wire type of shift device. The shift device 10 is installed to an instrument panel of a vehicle (automobile), and is disposed at the vehicle front side and vehicle width direction inside of a driving seat (not illustrated in the drawings) in the vehicle. The front side, the right side, and upper side of the shift device 10 are respectively oriented diagonally toward the upper front, toward the right side, and diagonally toward the upper rear of the vehicle.

As illustrated in FIG. 1 and FIG. 2, a substantially circular column shaped knob base 12, serving as a support member, is provided at the shift device 10. A lower end of the knob base 12 is fixed to the inside of the instrument panel (a vehicle body side). The axial direction of the knob base 12 is disposed parallel to the up-down direction, and an upper side portion of the knob base 12 projects out, from the instrument panel, in a vehicle cabin.

A substantially circular tube shaped knob 14, serving as a shift body, is coaxially supported by an outer periphery of the knob base 12 so as to be capable of rotation. An upper side portion of the knob 14 projects out, from the instrument panel, in the vehicle cabin, and is capable of being rotation-operated by an occupant of the vehicle (particularly a driver seated in the driving seat). The knob 14 is capable of rotating within a specific range in one direction (the arrow A direction in FIG. 1, etc.) and another direction (the arrow B direction in FIG. 1, etc.), and capable of changing shift positions. The knob 14 is capable of being disposed in a P position (a parking position) serving as a specific shift position, an R position (a reverse position), an N position (a neutral position), or a D position (a drive position), on progression from the another direction side toward the one direction side.

A rectangular parallelopiped shaped rotation protrusion 14A (see FIG. 6), serving as a rotated portion, is integrally provided to a lower side portion of the knob 14, and the rotation protrusion 14A projects out toward an outer peripheral outside of the knob 14.

A rectangular parallelopiped shaped first recessed portion 16 and a rectangular parallelopiped shaped second recessed portion 18, each serving as a restricting portion, are formed at a lower end portion of the knob 14. The insides of the first recessed portion 16 and the second recessed portion 18 are open toward the outer peripheral outside of the knob 14, and the first recessed portion 16 is disposed on the one direction side of the second recessed portion 18.

A detent mechanism (not illustrated in the drawings) serving as a holding section, is provided between the knob base 12 and the knob 14. The detent mechanism urges the knob 14 in a direction(s) from a position between shift positions towards the shift position(s), and holds (retains) the knob 14 in each shift position by urging force. The knob 14 is rotation-operated against the urging force of the detent mechanism, and detent sensation is thereby imparted to the rotation-operation of the knob 14.

At the knob base 12 or the knob 14, a shift sensor (not illustrated in the drawings), serving as a shift detection section, is provided, and the shift sensor detects the rotation position of the knob 14, and detects the shift position of the knob 14. The shift sensor is electrically connected to a controller (not illustrated in the drawings) of the vehicle, and an automatic transmission (not illustrated in the drawings) of the vehicle is electrically connected to the controller. The controller controls such that, by the shift position of the knob 14 being changed, the automatic transmission is changed to the shift range (P range (parking range), R range (reverse range), N range (neutral range), or D range (drive range)) corresponding to the shift position of the knob 14.

An engine start-stop switch (not illustrated in the drawings), serving as a rotation operation portion, is electrically connected to the controller, and the engine (not illustrated in the drawings) of the vehicle is also electrically connected to the controller. The engine starts when the engine start-stop switch is operated by the occupant when the engine is in a stationary (stop) state. The engine stops when the engine start-stop switch is operated by the operator in a state in which the engine is being driven.

A brake (not illustrated in the drawings), serving as a vehicle braking section, is electrically connected to the controller, and the vehicle is braked when the brake has been operated by the occupant. A lock switch (not illustrated in the drawings), serving as a restricting operation section, is electrically connected to the controller, and the lock switch is capable of being operated by the occupant.

An operating mechanism 20, serving as operating section, is provided inside the instrument panel outside the outer periphery of the knob base 12. The operating mechanism 20 is provided with a shift locking mechanism 22 serving as a restricting section, and an autocorrect mechanism 24 serving as a rotating section.

The operating mechanism 20 is provided with a motor 26, serving as a drive section. The motor 26 configures part of both the shift locking mechanism 22 and the autocorrect mechanism 24. The motor 26 is fixed to the vehicle body side, and the motor 26 is disposed at the front side of the lower side portion of the knob 14.

A transmitting mechanism 28 is mechanically connected to the motor 26. The transmitting mechanism 28 configures part of both the shift locking mechanism 22 and the autocorrect mechanism 24. The transmitting mechanism 28 is provided with a worm gear 30. The worm gear 30 is coaxially fixed to an output shaft of the motor 26 so as to be capable of rotating integrally therewith, and is disposed with its axial direction parallel to the left-right direction. A helical gear 32 enmeshes with the worm gear 30. The helical gear 32 is coaxially fixed to a front end portion of a worm shaft 34 so as to be capable of rotating integrally therewith. The worm shaft 34 is supported inside the instrument panel so as to be capable of rotation, and is disposed with its axial direction parallel to the front-rear direction. The worm gear 30, the helical gear 32, and the worm shaft 34 are rotated by the motor 26 being driven.

A substantially circular tube shaped rotor cam 36, serving as a moving member, is mechanically connected to a rear side portion of the worm shaft 34. The rotor cam 36 configures part of both the shift locking mechanism 22 and the autocorrect mechanism 24. The rotor cam 36 is coaxially supported at the outer periphery of the lower side portion of the knob 14 so as to be capable of relatively rotating (moving), and a helical gear portion 36A is formed at an outer peripheral face of the rotor cam 36. The rear side portion of the worm shaft 34 enmeshes with the helical gear portion 36A, and the rotor cam 36 is rotated by rotation of the worm shaft 34.

A curved rectangular column shaped release frame 38, serving as an operating portion, is integrally provided at a front side portion at a lower end portion of the rotor cam 36. The release frame 38 curves along a peripheral wall of the rotor cam 36. A release recessed portion 38A is formed at an end portion at the another direction side of the release frame 38. The release recessed portion 38A is open toward the radial direction outside and the another direction side of the rotor cam 36. A face of the release recessed portion 38A at the one direction side slopes in a direction toward the radial direction outside of the rotor cam 36 on progression along the one direction.

A curving rectangular column shaped rotating frame 40, serving as a rotating portion, is integrally provided at a left side portion at the lower end portion of the rotor cam 36. The rotating frame 40 curves along the peripheral wall of the rotor cam 36. The rotating frame 40 is separated from the release frame 38 at the another direction side, and the rotating frame 40 is separated from the rotation protrusion 14A of the knob 14 at the one direction side, such that the rotation protrusion 14A does not abut the rotating frame 40 even when the knob 14 is rotated to the "D" position (see FIG. 6).

The shift locking mechanism 22 is provided with a lock shaft 42, serving as a supporting portion. Diagonally to the front left of the lower side portion of the knob 14, the lock shaft 42 is supported by the vehicle body side so as to be capable of rotating (moving), and is disposed parallel to the up-down direction. A base end portion of a lock bar 44, which appears as an L-shaped column in plan view and serves as restricting member, is supported by the lock shaft 42. The lock bar 44 is disposed diagonally to the front left of the lower end portion of the knob 14, and a leading end portion of the lock bar 44 extends toward the knob 14 side. A lock link 46, which has an L-shape in plan view and serves as an operating member, is supported at the upper side of the lock bar 44 by the lock shaft 42. The lock link 46 is disposed diagonally to the front left of the lower side portion of the knob 14, and a leading end portion of the lock link 46 extends toward the rotor cam 36 side (rear side) at the position of the lower end portion of the rotor cam 36. The lock shaft 42, the lock bar 44, and the lock link 46 are capable of rotating integrally to each other. When the lock shaft 42, the lock bar 44, and the lock link 46 are rotated toward a lock side (restrict side), the leading end portion of the lock bar 44 and the leading end portion of the lock link 46 respectively approach the knob 14 and the rotor cam 36. When the lock shaft 42, the lock bar 44, and the lock link 46 are rotated toward an unlock side (restriction release side), the leading end portion of the lock bar 44 and the leading end portion of the lock link 46 respectively move away from (separated from) the knob 14 and the rotor cam 36.

The lock shaft 42 is coaxially inserted inside a lock spring 48, serving as an urging section, between the lock bar 44 and the lock link 46. The lock spring 48 spans across between the lock bar 44 or the lock link 46, and the vehicle body side, and urges the lock shaft 42, the lock bar 44, and the lock link 46 toward the lock side.

A lock sensor (not illustrated in the drawings), serving as a restriction detecting section, is provided in the vicinity of the lock link 46 (or may be provided in the vicinity of the lock bar 44). The lock sensor detects a rotation position of the lock link 46 (or may be of the lock bar 44) and is electrically connected to the controller.

Explanation follows regarding operation of the present exemplary embodiment.

As illustrated in FIG. 1 and FIG. 2, in the shift device 10 with the above configuration, in a case in which the knob 14 is disposed in the "P" position (in a case in which the shift sensor detects that the shift position of the knob 14 is the "P" position), when the brake is not operated, the controller controls such that the motor 26 is forward-driven, and the rotor cam 36 is rotated in the one direction via the transmitting mechanism 28 (the worm gear 30, the helical gear 32, and the worm shaft 34) in the shift locking mechanism 22 of the operating mechanism 20. Thus, the leading end portion of the lock link 46 is disposed at the another direction side of the release frame 38 of the rotor cam 36, and the lock shaft 42, the lock bar 44, and the lock link 46 are rotated toward the lock side under the urging force of the lock spring 48, due thereto, the leading end portion of the lock bar 44 is inserted inside of the first recessed portion 16 of the knob 14. Rotation of the knob 14 is thereby locked (restricted) by the lock bar 44, and rotation of the knob 14 from the P position toward the R position, the N position, or the D position is locked (restricted). When the leading end portion of the lock bar 44 has been inserted inside the first recessed portion 16 of the knob 14 (when the lock sensor detects that the lock link 46 is disposed in a rotation position at which the leading end portion of the lock bar 44 has been inserted inside the first recessed portion 16), the controller controls such that forward-driving of the motor 26 is stopped, and rotation of the rotor cam 36 in the one direction is stopped.

Figure 3:
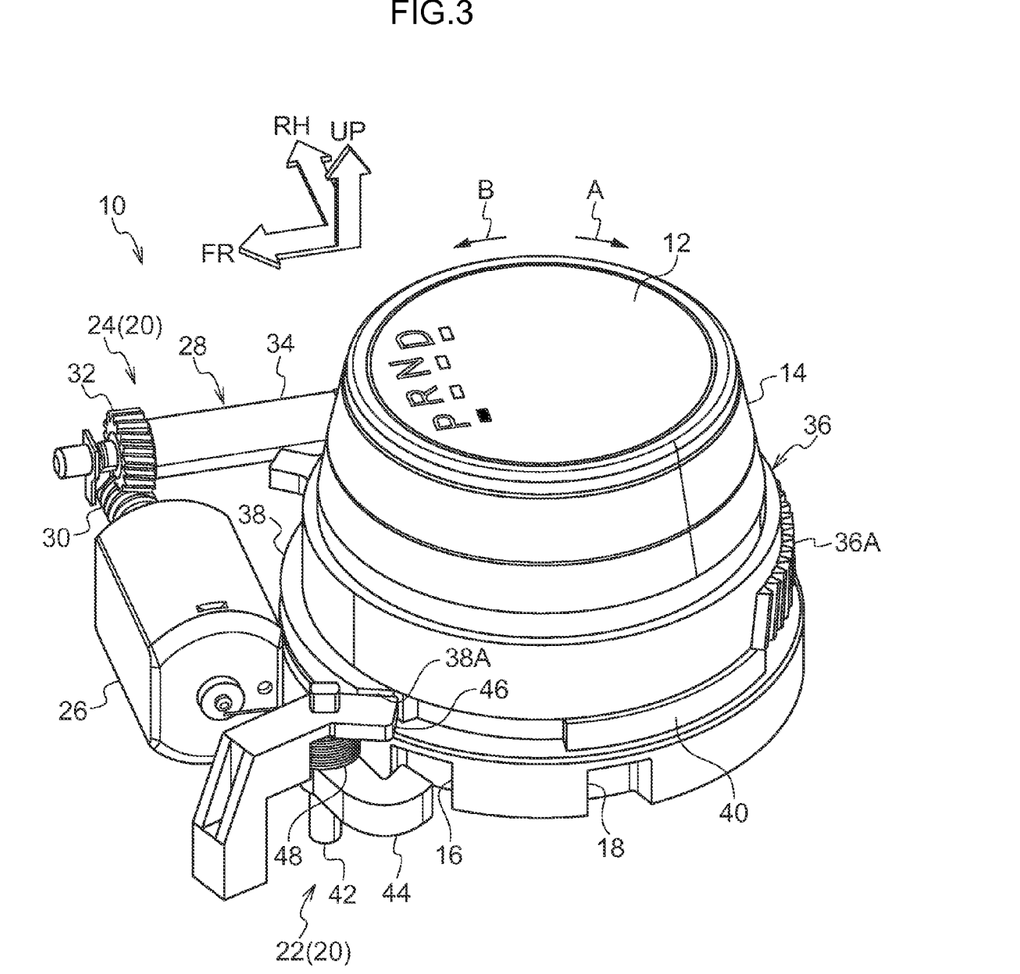
FIG. 3 is a perspective view illustrating a situation in which locking of rotation of a knob from a P position is released in a shift device according to an exemplary embodiment of the present invention, viewed diagonally from the front left.
Figure 4:
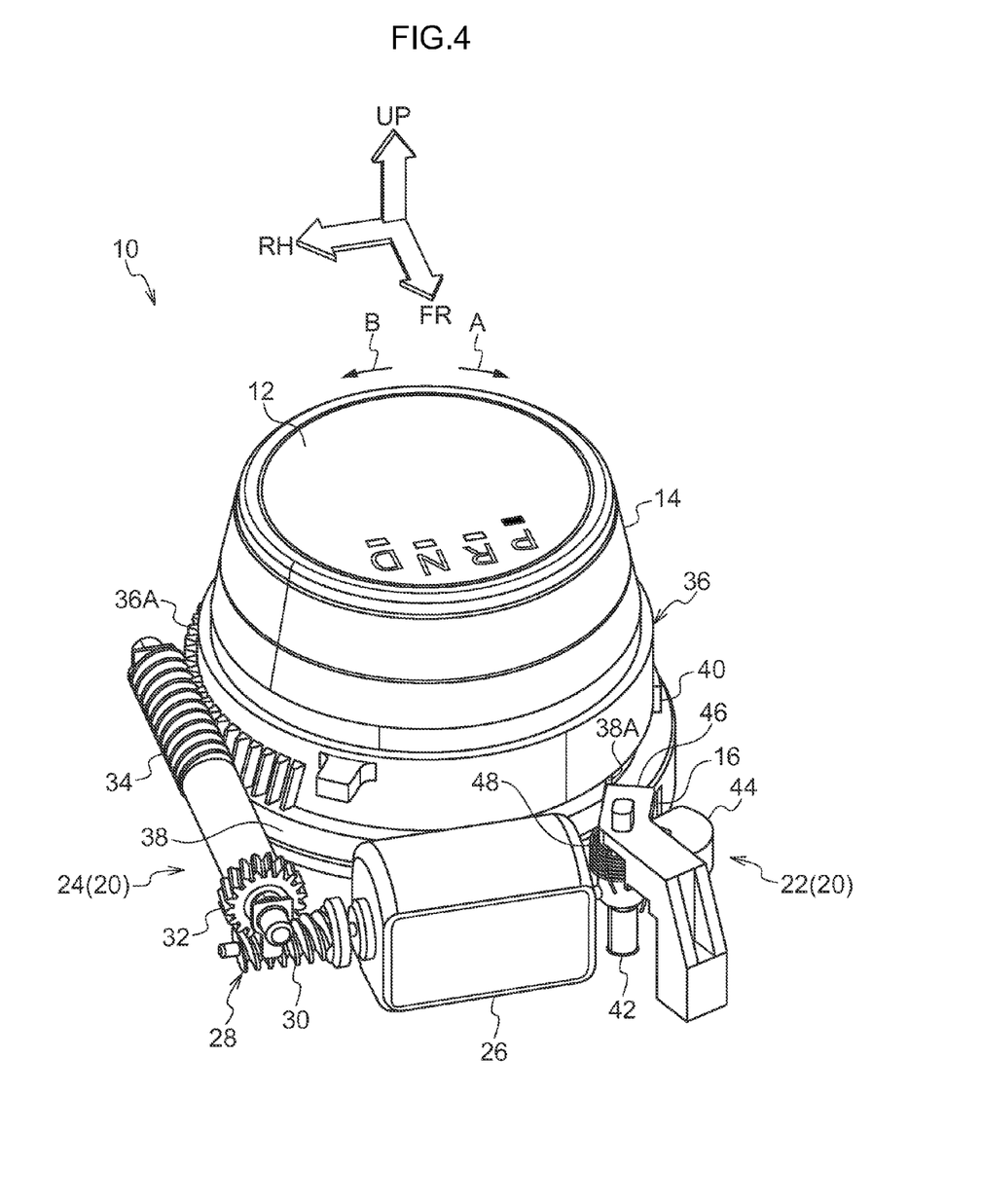
FIG. 4 is a perspective view illustrating a situation in which locking of rotation of a knob from a P position is released in a shift device according to an exemplary embodiment of the present invention, viewed from the front side.
Figure 5:
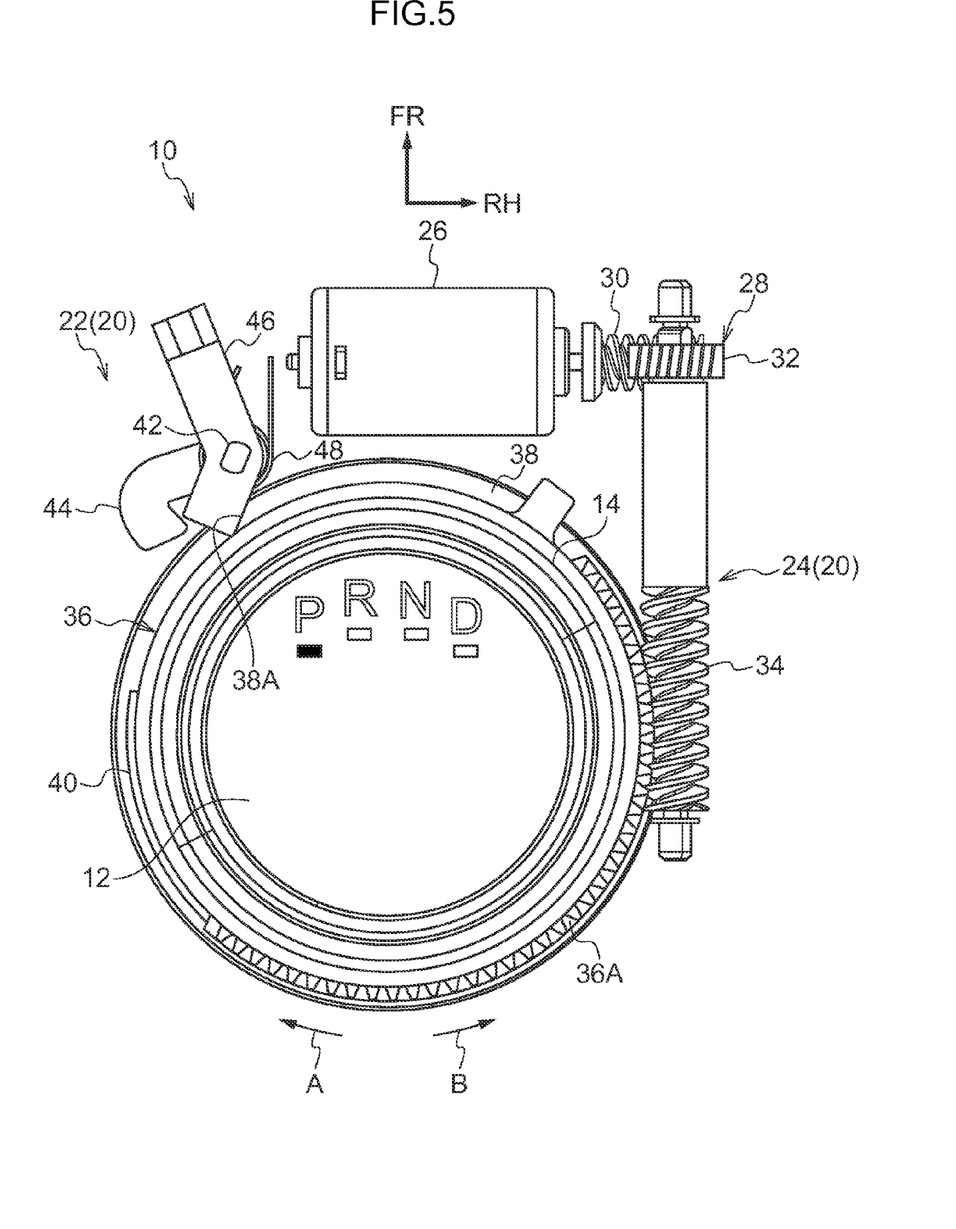
FIG. 5 is a plan view illustrating a situation in which locking of rotation of a knob from a P position is released in a shift device according to an exemplary embodiment of the present invention, viewed from above.

As illustrated in FIG. 3 to FIG. 5, in a case in which the knob 14 is disposed in the P position, when the brake has been operated, the controller controls such the motor 26 is reverse-driven, and the rotor cam 36 is rotated in the another direction via the transmitting mechanism 28 in the shift locking mechanism 22 of the operating mechanism 20. Thus, by the leading end portion of the lock link 46 being inserted inside the release recessed portion 38A of the release frame 38 of the rotor cam 36, the lock shaft 42, the lock bar 44, and the lock link 46 are rotated to the unlock side against the urging force of the lock spring 48, and the leading end portion of the lock bar 44 comes out from (moves away from) the inside of the first recessed portion 16 of the knob 14. The locking of rotation of the knob 14 by the lock bar 44 is thereby released, and the knob 14 is capable of rotating from the P position to the R position, the N position, or the D position. When the leading end portion of the lock link 46 has been inserted inside the release recessed portion 38A of the release frame 38 (when the lock sensor detects that the lock link 46 is disposed in a rotation position in which the leading end portion has been inserted the inside of the release recessed portion 38A), the controller controls such that reverse-driving of the motor 26 is stopped, and the rotation of the rotor cam 36 in the another direction is stopped.

In a case in which the knob 14 is disposed in the N position (in a case in which the shift sensor detects that the shift position of the knob 14 is the N position), when the lock switch has been operated, the controller controls such that the motor 26 is forward-driven, and the rotor cam 36 is rotated in the one direction via the transmitting mechanism 28 in the shift locking mechanism 22 of the operating mechanism 20. Thus, the leading end portion of the lock link 46 is disposed at the another direction side of the release frame 38 of the rotor cam 36, and the lock shaft 42, the lock bar 44, and the lock link 46 are rotated toward the locked side under the urging force of the lock spring 48, due thereto, the leading end portion of the lock bar 44 is inserted inside of the second recessed portion 18 of the knob 14. The rotation of the knob 14 is thereby locked by the lock bar 44, and the rotation of the knob 14 from the N position to the P position, the R position, or the D position is locked. When the leading end portion of the lock bar 44 has been inserted inside the second recessed portion 18 of the knob 14 (when the lock sensor detects that the lock link 46 is disposed in a rotation position in which the leading end portion of the lock bar 44 has been inserted inside the second recessed portion 18), the controller controls such that forward-driving of the motor 26 is stopped, and rotation of the rotor cam 36 in the one direction is stopped.

In a case in which the knob 14 is disposed in the N position (in a case in which the shift sensor detects that the shift position of the knob 14 is the N position), when the lock switch has been operated in a state in which rotation of the knob 14 from the N position is locked, the controller controls such that the motor 26 is reverse-driven, and the rotor cam 36 is rotated in the another direction via the transmitting mechanism 28 in the shift locking mechanism 22 of the operating mechanism 20. Thus, by the leading end portion of the lock link 46 being inserted inside the release recessed portion 38A of the release frame 38 of the rotor cam 36, the lock shaft 42, the lock bar 44, and the lock link 46 are rotated against the urging force of the lock spring 48 toward the unlock side, and the leading end portion of the lock bar 44 comes out from (moves away from) the inside of the second recessed portion 18 of the knob 14. The locking of the rotation of the knob 14 by the lock bar 44 is thereby released, and the knob 14 is capable of rotating from the N position to the P position, the R position, or the D position. When the leading end portion of the lock link 46 has been inserted inside the release recessed portion 38A of the release frame 38 (when the lock sensor detects that the lock link 46 is disposed in a rotation position in which the leading end portion has been inserted inside the release recessed portion 38A), the controller controls such that reverse-driving of the motor 26 is stopped, and rotation of the rotor cam 36 in the another direction is stopped.

Figure 6:
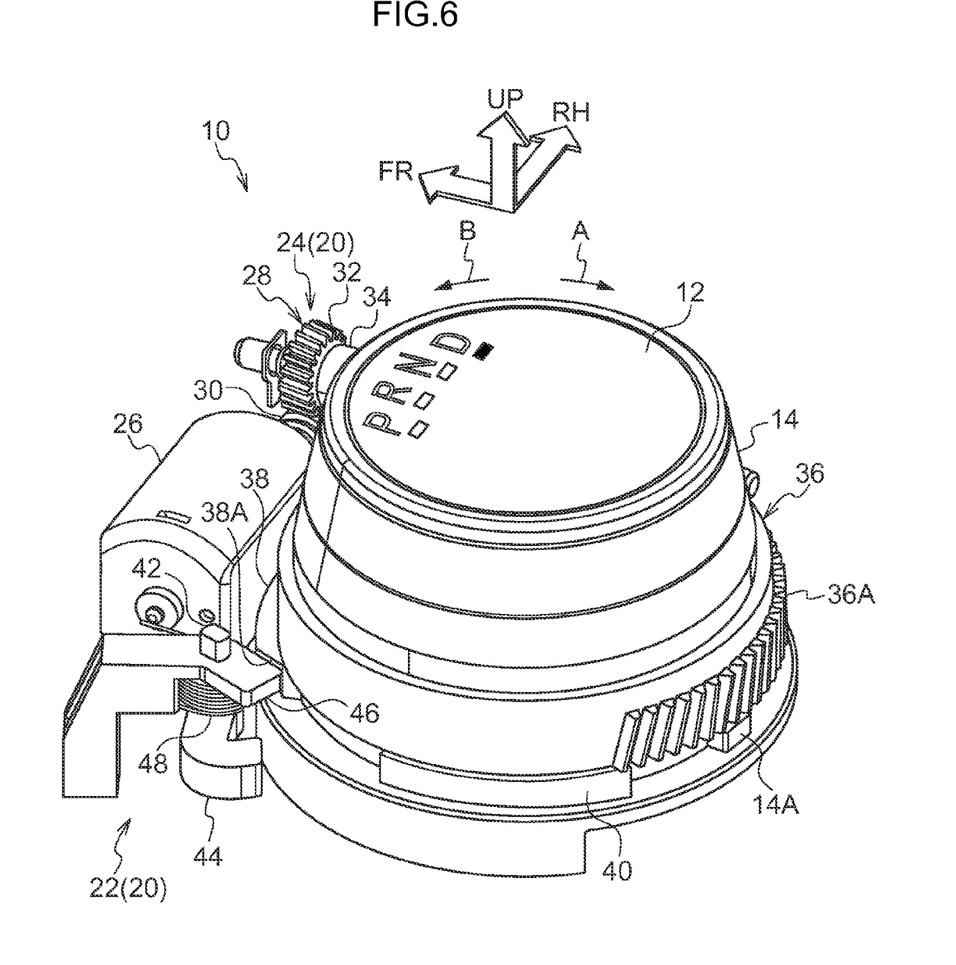
FIG. 6 is a perspective view illustrating a situation in which a knob is disposed in a D position in a shift device according to an exemplary embodiment of the present invention, viewed diagonally from the rear left.

As illustrated in FIG. 6, in a case in which the knob 14 is disposed in a shift position other than the P position (the R position, the N position, or the D position; the D position in FIG. 6) (in a case in which the shift sensor detects that the shift position of the knob 14 is a shift position other than the P position), when the engine start-stop switch is operated and the engine has been stopped, the controller controls such that shift range of the automatic transmission changes to the P range. A state in which the shift range of the automatic transmission has changed to the P range is maintained until the knob 14 is rotated to a shift position other than the P position (until the shift sensor detects that the shift position of the knob 14 has changed to a shift position other than the P position) after the engine start-stop switch is next operated and the engine starts. Thus, the shift range of the automatic transmission is always in the P range when the engine start-stop switch has been operated.

Figure 7:
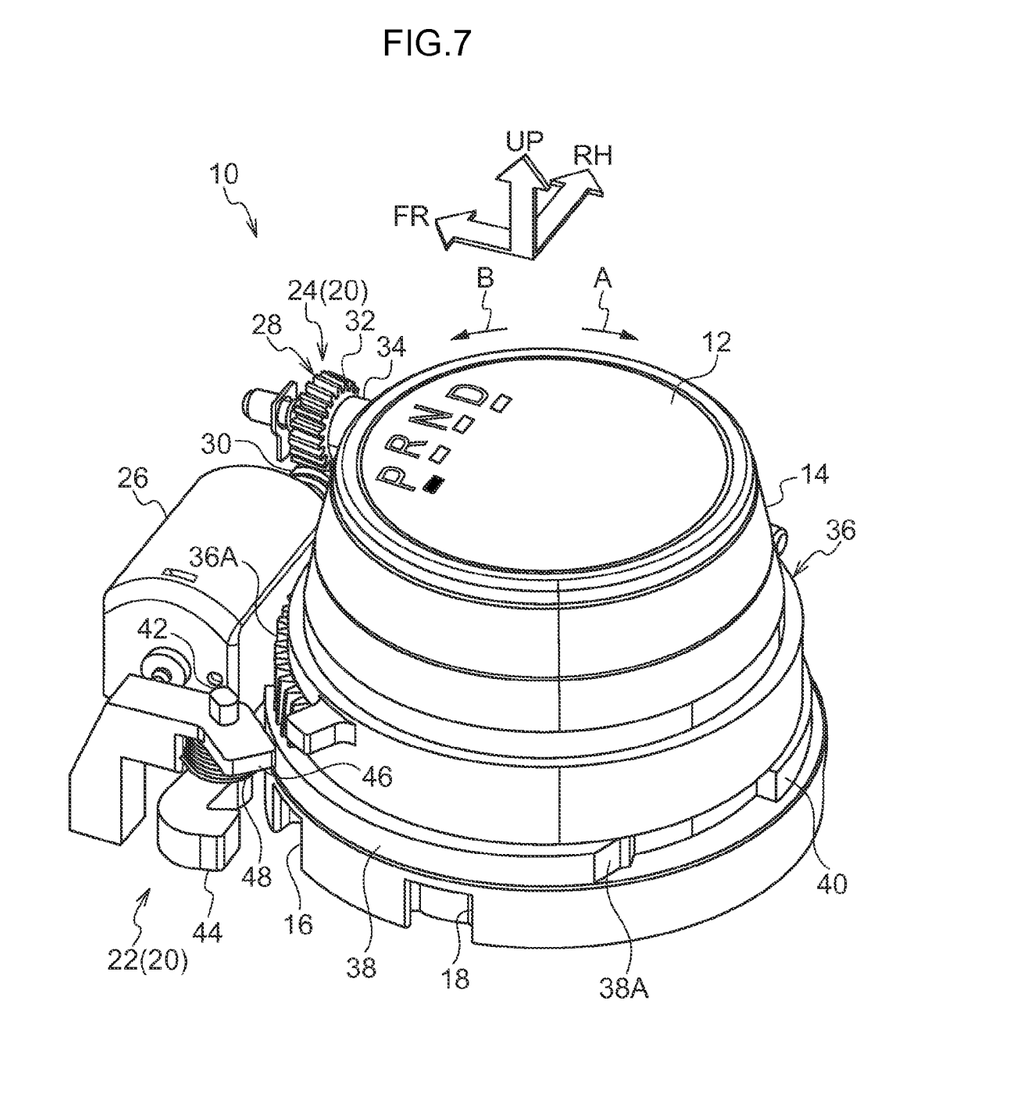
FIG. 7 is a perspective view illustrating a situation in which an autocorrect mechanism rotates a knob to a P position in a shift device according to an exemplary embodiment of the present invention, viewed diagonally from the rear left.

As illustrated in FIG. 7, when the engine start-stop switch has been operated (at a specific occasion when at least one of engine stop or engine start has been performed) in a case in which the knob 14 is disposed in a shift position other than the P position, the controller controls such that the motor 26 is reverse-driven, and the rotor cam 36 is rotated in the another direction (to one side) via the transmitting mechanism 28 in the autocorrect mechanism 24 of the operating mechanism 20. Thus, due to the leading end portion of the lock link 46 riding up onto the outer peripheral face of the release frame 38 of the rotor cam 36, the lock shaft 42, the lock bar 44, and the lock link 46 are rotated toward the unlock side against the urging force of the lock spring 48, such that the leading end portion of the lock bar 44 is incapable of being inserted inside the first recessed portion 16 of the knob 14 and also incapable of being inserted inside the second recessed portion 18 of the knob 14. The rotating frame 40 of the rotor cam 36 presses the rotation protrusion 14A of the knob 14 at the another direction side so rotates the knob 14 in the another direction, such that the knob 14 is rotated to the P position. Thus, the knob 14 can be disposed in (returned to) the P position when the engine start-stop switch has been operated, and the shift position of the knob 14 and the shift range of the automatic transmission can be made to match each other.

When the knob 14 has been rotated to the P position (when the shift sensor detects that the shift position of the knob 14 is the P position), the controller controls such that the motor 26 is forward-driven, and the rotor cam 36 is rotated in the one direction (to another side) via the transmitting mechanism 28. Further, the riding-up of the leading end portion of the lock link 46 onto the outer peripheral face of the release frame 38 of the rotor cam 36 is released, and the lock shaft 42, the lock bar 44, and the lock link 46 are rotated toward the lock side under the urging force of the lock spring 48. Due thereto, when the leading end portion of the lock link 46 has been inserted inside the release recessed portion 38A of the release frame 38 of the rotor cam 36, or when the leading end portion of the lock bar 44 has been inserted inside the first recessed portion 16 of the knob 14 (when the lock sensor detects that the lock link 46 is disposed in a rotation position in which the leading end portion of the lock link 46 has been inserted inside the release recessed portion 38A, or that the lock link 46 is disposed in a rotation position in which the leading end portion of the lock bar 44 has been inserted inside the first recessed portion 16), the controller controls such that the forward-driving of the motor 26 is stopped, and rotation of the rotor cam 36 in the one direction is stopped. Thus, even if the knob 14 is rotated from the P position to the D position, due to the rotating frame 40 of the rotor cam 36 being away from the rotation protrusion 14A of the knob 14 to the one direction side, the rotation protrusion 14A of the knob 14 is incapable of abutting the rotating frame 40 of the rotor cam 36.

Note that, as described above, in the shift locking mechanism 22, the motor 26 is driven and the shift locking mechanism 22 performs locking and locking release of the rotation of the knob 14, and also in the autocorrect mechanism 24, the motor 26 is driven and the autocorrect mechanism 24 changes the shift position of the knob 14 to the P position. Thus, the driving of a common motor 26 enables locking and locking release of the rotation of the knob 14 to be performed, and further enables the shift position of the knob 14 to be changed to the P position. Therefore, it enables the number of components to be reduced, enables configuration of the shift device 10 to be simplified, and enables the shift device 10 to be made smaller in size.

As described above, the rotor cam 36 is rotated and locking and locking release of the rotation of the knob 14 is performed in the shift locking mechanism 22, and also the rotor cam 36 is rotated and the shift position of the knob 14 is changed to the P position in the autocorrect mechanism 24. Thus, the rotating a common rotor cam 36 enables locking and locking release of the rotation of the knob 14 to be performed, and further enables the shift position of the knob 14 to be changed to the P position. Therefore, it enables the number of components to be further reduced, enables configuration of the shift device 10 to be further simplified, and enables the shift device 10 to be made even smaller in size.

As described above, the transmitting mechanism 28 (the worm gear 30, the helical gear 32, and the worm shaft 34) is operated (rotated) and locking and locking release of the rotation of the knob 14 is performed in the shift locking mechanism 22, and also the transmitting mechanism 28 is operated and the shift position of the knob 14 is changed to the P position in the autocorrect mechanism 24. Thus operating a common transmitting mechanism 28 enables locking and locking release of the rotation of the knob 14 to be performed, and further enables the shift position of the knob 14 to be changed to the P position. Therefore, it enables the number of components to be further reduced, enables configuration of the shift device 10 to be further simplified, and enables the shift device 10 to be made even smaller in size.

As described above, in the autocorrect mechanism 24, even if the knob 14 is rotated from the P position to the D position due to the rotor cam 36 being rotated in the one direction (to another side) after the rotating frame 40 of the rotor cam 36 presses the rotation protrusion 14A of the knob 14 at the another direction side by the rotor cam 36 being rotated in the another direction (to the one side) and the knob 14 is rotated to the P position, the rotation protrusion 14A of the knob 14 is incapable of abutting the rotating frame 40 of the rotor cam 36. This enables the knob 14 to be rotated from the P position to the R position, the N position, or the D position.

As described above, when the autocorrect mechanism 24 rotates the knob 14 to the P position, due to the leading end portion of the lock link 46 riding up onto the outer peripheral face of the release frame 38 of the rotor cam 36, the lock shaft 42, the lock bar 44, and the lock link 46 are rotated toward the unlock side, such that the leading end portion of the lock bar 44 is incapable of being inserted inside the first recessed portion 16 or inside the second recessed portion 18 of the knob 14. Thus, due to the lock release of the rotation of the knob 14 being maintained by the shift locking mechanism 22, the autocorrect mechanism 24 can rotate the knob 14 to the P position.

Note that in the present exemplary embodiment, when the engine start-stop switch is operated and the engine has been stopped in a state in which the knob 14 is disposed in a shift position other than the P position, the shift position of the knob 14 may be changed to the P position after the shift range of the automatic transmission has changed to the P range. Alternatively, the shift range of the automatic transmission may be changed to the P range after the shift position of the knob 14 has changed to the P position.

In the present exemplary embodiment, the shift locking mechanism 22 performs locking and locking release of rotation of the knob 14 from the P position and from the N position. However, the shift locking mechanism 22 may perform locking or locking release of rotation of the knob 14 from shift positions other than the P position or the N position (such as the R position or the D position).

In the present exemplary embodiment, in the shift locking mechanism 22, the lock spring 48 urges the lock shaft 42, the lock bar 44, and the lock link 46 toward the lock side, and the rotor cam 36 is capable of rotating the lock shaft 42, the lock bar 44, and the lock link 46 toward the unlock side. However, in the shift locking mechanism 22, configuration may be such that the lock spring 48 urges the lock shaft 42, the lock bar 44, and the lock link 46 toward the unlock side, and the rotor cam 36 is capable of rotating the lock shaft 42, the lock bar 44, and the lock link 46 toward the lock side.

In the present exemplary embodiment, the shift locking mechanism 22 performs locking and locking release of the rotation of the knob 14. However, it is sufficient that the shift locking mechanism 22 performs at least one of either locking or locking release of the rotation of the knob 14.

In the present exemplary embodiment, the autocorrect mechanism 24 changes the shift position of the knob 14 to the P position. However, the autocorrect mechanism 24 may change the shift position of the knob 14 to a shift position other than the P position (such as the R position, the N position, or the D position).

In the present exemplary embodiment, the autocorrect mechanism 24 rotates the knob 14 and changes the shift position of the knob 14 by rotating the rotor cam 36. However, similarly to Japanese National-Phase Publication No. 2008-511063, the autocorrect mechanism 24 may be configured so as to change a rotatable range of the knob 14 and to change the shift position of the knob 14, by rotating (moving) the rotor cam 36 (a moving member).

In the present exemplary embodiment, the shift device 10 is a shift-by-wire type of shift device. However, the shift device 10 may be a shift device other than a shift-by-wire type (such as mechanical cable type).

In the present exemplary embodiment, the shift device 10 is installed to an instrument panel. However, the shift device 10 may be installed to a floor section of the vehicle cabin, or to a steering column cover.

What is claimed is:

1. A shift device, comprising:
   a shift body that is rotated to change a shift position of the shift body;
   an operating section that is provided with a drive section, wherein the drive section is driven to perform at least one of restricting, or releasing restriction of, rotation of the shift body, and the drive section, which is the same drive section that is driven when performing at least one of restricting, or releasing restriction of, rotation of the shift body, is driven to change the shift position to a specific shift position of the shift body, and
   a moving member that is relatively moveable with respect to the shift body, and that is provided at the operating section,
      wherein the moving member is moved due to the drive section being driven to perform at least one of restricting, or releasing restriction of, rotation of the shift body, and
      wherein the moving member is moved due to the drive section being driven to change the shift position to the specific shift position,
      wherein the moving member maintains released restriction of rotation of the shift body when the shift body is rotated to the specific shift position, and wherein the shift device further comprises:
  a restricting member; and
    a restricting portion provided at the shift body, and
    a guide protrusion provided at the moving member so as to protrude from the moving member toward outside of the moving member,
    wherein at least one of restricting, or releasing restriction of, rotation of the shift body, is performed by the restricting member and the restricting portion approaching one another or separating from each other by the restricting member being moved by being guided by the guide protrusion due to the moving member being moved, and
  wherein the shift device further comprises
    a shift body side rotation protrusion provided at the outside of the shift body, and
    a moving member side rotation protrusion provided at the outside of the moving member,
    wherein the shift position is changed to the specific shift position by pressing between the shift body side rotation protrusion and the moving member side rotation protrusion due to the moving member being moved.

2. The shift device of claim 1, wherein the moving member is moved toward one side to rotate the shift body to the specific shift position and, thereafter, is moved toward another side which is opposite to the one side.

3. The shift device of claim 1, wherein:
  the moving member is supported at the shift body so as to be relatively rotatable to the shift body;
  at least one of restricting, or releasing restriction of, rotation of the shift body is performed by the moving member being rotated by driving of the drive section; and
  the shift position is changed to the specific shift position of the shift body by the moving member being rotated by driving of the drive section.

4. The shift device of claim 3, wherein the moving member is rotated toward one side to rotate the shift body to the specific shift position and, thereafter, is rotated toward another side which is opposite to the one side.

5. The shift device of claim 1, wherein the moving member is supported by the shift body, and the moving member is moved so as to be rotated around an axis of the shift body due to the drive section being driven.

6. The shift device of claim 1, wherein at least one of restricting, or releasing restriction of, rotation of the shift body, is performed by the restricting member and the restricting portion being engaged or being disengaged due to the moving member being moved.

7. The shift device of claim 1, wherein the shift body is supported at a shift body axis fixed at a vehicle body side, and the lock axis is supported at the vehicle body side, and the shift body axis and the lock axis are disposed at different positions at the vehicle body side.

* * * * *